UNITED STATES PATENT OFFICE.

FRIEDRICH ALBRECHT, OF MELBOURNE, VICTORIA.

MEANS FOR COUPLING PIPES OR COCKS TO FLUID MAINS, BRANCHES, RECEPTACLES, OR TANKS.

SPECIFICATION forming part of Letters Patent No. 657,504, dated September 11, 1900.

Application filed June 22, 1900. Serial No. 21,168. (No model.)

*To all whom it may concern:*

Be it known that I, FRIEDRICH ALBRECHT, a subject of the Emperor of Germany, residing at No. 379 Swanston street, Melbourne, in the Colony of Victoria, have invented certain new and useful Means for Coupling Pipes or Cocks to Fluid Mains, Branches, Receptacles, or Tanks, of which the following is a specification.

This invention has been devised to provide an improved means for coupling or attaching pipes or cocks to mains or branch pipes thereof and for fixing pipes or cocks to receptacles, such as tanks, cisterns, &c., particularly where such pipes, branches, mains, or receptacles contain water, gas, or other fluid.

In order that the invention may be made clear, I have described same with reference to the accompanying sheet of drawings, in which—

Figure 1 shows a portion of piping in cross-section with the coupling applied to it. Fig. 2 is a longitudinal view showing the same. Fig. 3 is a plan showing the feet of coupling. Fig. 4 is a plan of under side of washer. Fig. 5 is a plan of under side of washer provided with a channel to receive a washer or packing. Fig. 6 shows vertical section through same. Fig. 7 shows the coupling in elevation as applied to tins and the like. Fig. 8 shows the inside face of a detached foot of the coupling. Fig. 9 shows a plan of the under side of feet of coupling. Fig. 10 shows the coupling with cock attached.

I employ a metal coupling piece or pipe A, screwed at one end $a$ and having a collar B or enlarged ring provided about its center to form a butt-piece or limitation-stopper. At the back of this butt-piece a plain tubular construction C proceeds for a short distance, the distance being approximately the thickness of the main, branch pipe, or tank, &c., in and to which the coupling-piece is to be fixed.

The tubular coupling is formed of two longitudinal sections, (see Fig. 3,) the back end of each terminating in left and right hand extension-pieces D, respectively. These extension-pieces or feet are preferably about one-half the width or diameter of the unscrewed portion of the tube, from which they branch off at right angles by about a length equaling the diameter of the tube. These pieces are of stout construction, it being against them that the whole strain of the coupling when secured in position will be imposed. A hole is bored into the pipe or main E to which it is desired to attach the coupling, the extension-pieces introduced with their feet in opposite directions to one another, and the two halves brought together, so that the ring B at the end of the thread rests upon and outside the main, while the two projecting pieces D are on the inner side of the main, pointing in opposite directions to one another, but parallel with the length of the main.

Upon the limitation stopper-ring B two flats $b$ are cut—that is to say, one on each half—so as to agree with a thick metal washer F, preferably of lead, and having two squared keys or blocks $f$ formed therein, Fig. 4, to correspond with the flats on the half-rings. This washer is passed down on the tube-coupling and may be held in position by a lock-nut. In some cases the lock-nut may be dispensed with, as the pipe-connection piece or cock G can be screwed onto the coupling-piece A and brought down tightly onto the top of the washer, so as to make a water or gas tight joint. In some cases a thin leather insertion, white lead, or like filling may be placed between the lead washer F and the pipe of the branch or main E on which it is connected, or the bottom of said washer may be calked, so as to form a tight joint and prevent leakage. The washer has its lower side shaped to correspond with the surface of the pipe or main or of the tank or receptacle, as the case may be, upon which the coupling is to be fixed, and in some cases may be grooved to hold the packing, insertion, or filling H. K represents pipes coupled by my appliances. One of the sections has a pin $a'$, which enters a hole in the meeting face of the other.

When applying my invention to tins or drums containing kerosene, or other similar receptacles or tanks, a sharp-pointed instrument having a diameter slightly larger than the diameter of the plain tubular end of the coupling may be driven into the tin or drum at the required position, so as to cause a perforation in and to which my coupling may be introduced in manner hereinbefore referred to in connection with pipes and mains. This instrument may be formed in one with the pipe-connection piece G' and have a length of flexible pipe $G^2$ or a cock attached.

The coupling-pieces A' have in their inner faces a grooved channel C, such channel leading into the open tubular passage of the coupling.

J represents a cock used in lieu of piece G', L being a leather washer between it and the drum.

Figs. 1 and 2 show the coupling just prior to being tightened up. A turn or two of the piece G will draw the part $d$ against the pipe E and close the parts together to form a water-tight joint.

Having now particularly described and ascertained the nature of my said invention and in what manner the same is to be performed, I declare that what I claim is—

1. A coupling for pipes or cocks comprising two meeting tubular sections, each having a foot arranged to extend in opposite directions and on opposite sides of a radial line running parallel with the inner sides of said feet, substantially as described.

2. A coupling for pipes comprising two tubular sections, each having a foot-piece and a threaded portion, a collar carried by said sections and a washer inclosing said collar and interlocking therewith to prevent the turning thereof, substantially as described.

3. The means for coupling pipes or cocks to fluid mains, branches, receptacles or tanks comprising two meeting tubular sections each having a foot-piece arranged to lie in opposite directions to the other pipe and having screwed portion and stop-collar in combination with a lead washer F and a coupling-piece G substantially as and for the purposes set forth.

4. The means for coupling pipes or cocks to fluid mains, branches, receptacles or tanks comprising two meeting tubular sections each having a foot-piece arranged to lie in opposite direction to the other pipe and having screwed portion and stop-collar with flat portions in combination with a lead washer F with corresponding flat projections $f$ and a coupling-piece G substantially as and for the purposes set forth.

In testimony whereof I have signed my name to this specification in the presence of two subscribing witnesses.

FRIEDRICH ALBRECHT.

Witnesses:
A. O. SACHSE,
A. HARKER.